(No Model.)
I. S. McGIEHAN.
ARMORED PNEUMATIC TIRE.
No. 587,997. Patented Aug. 10, 1897.
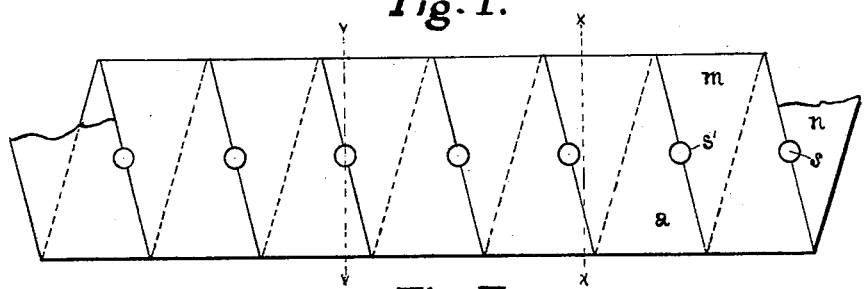
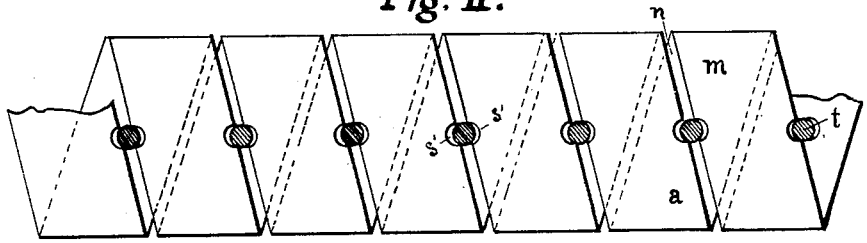
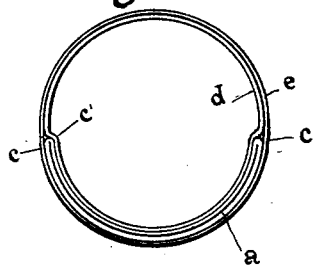  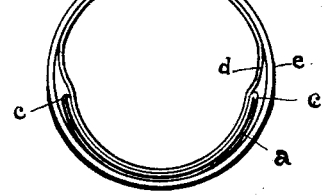
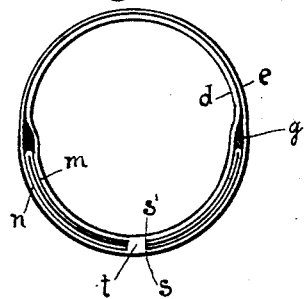
WITNESSES:
INVENTOR

UNITED STATES PATENT OFFICE.

ISAAC S. McGIEHAN, OF NEW YORK, N. Y.

ARMORED PNEUMATIC TIRE.

SPECIFICATION forming part of Letters Patent No. 587,997, dated August 10, 1897.

Application filed May 3, 1897. Serial No. 634,860. (No model.)

*To all whom it may concern:*

Be it known that I, ISAAC S. McGIEHAN, of the city, county, and State of New York, have invented a new and useful Improvement in Armored Pneumatic Tires for Bicycles, of which the following is a specification.

This invention relates to pneumatic tires for bicycles, and has for its object to provide an armor located on the tread side of the tire that will render it puncture-proof and at the same time increase the resiliency of the tire, as will be hereinafter explained.

In the accompanying drawings, which form a part of this specification, my invention is fully illustrated, with similar letters of reference to indicate corresponding parts, as follows:

Figure 1 represents a plan view of the armor $a$, which is usually composed of rawhide and formed like a flattened helix. Fig. 2 represents a similar view showing the effect produced when the armor is stretched lengthwise. Fig. 3 represents a transverse section through the armor $a$ at the line $x\,x$, Fig. 1, showing the upper and lower laps $m$ and $n$ before the armor is concaved to fit the tire. Fig. 4 represents the same after it is concaved, showing the crimping $m'$, which reinforces the rawhide on the inside lap $m$ and causes the laps to lie close together and retain the concavity independent of the outer covering $e$, Fig. 6. Fig. 5 represents a transverse section through a pneumatic tire, showing the armor $a$ in place on the tread side, and particularly showing that the concavity of the armor is greater than the transverse curvature of the outer covering $e$. This figure represents the tire as it would appear if the inner and outer covers $d$ and $e$ were not vulcanized together. Fig. 6 represents the same when the tire is completed, showing at $c'$ the manner in which the inner covering $d$ is pressed down over the edges $c$ and $c$ of the armor $a$ in forming the tire. Fig. 7 represents the same section at a point in the tire where it would intersect one of the holes $s$ through the armor $a$, say at the line $v\,v$, Fig. 1, to show the manner in which the inner and outer covering $d$ and $e$ are united through the holes $s$. This figure also shows the backing $g$, which is inserted when the tire is intended for heavy service.

The armor $a$ is made by taking a long narrow strip of rawhide or similar substance about the size shown in the drawings and while it is wet wind it over a round mandrel with the edges joined close together in the form of a spiral. As soon as it is partly dry it is slid off the mandrel and placed under a heavy press, where it receives sufficient pressure to eject all the moisture and make it very flat, as shown in Figs. 1 and 3. After the moisture is thoroughly squeezed out the armor is placed under the concaving-dies, where the inner lap $m$ is crimped, as shown at $m'$, Fig. 4, and the outer lap $n$ is stretched. It is then left to dry under a very heavy pressure. When the armor is prepared in this way, it will stand almost any pressure on the tread side before it will lose its concavity in the least.

After the armor is formed as above described a series of holes are cut through the armor directly upon the seam formed where the laps $m$ join on the upper side, which brings the hole directly in the center of the lap $n$ on the bottom side, as shown at $s$ and $s'$, Fig. 1. The armor is then ready to be inserted in the tire, which is usually accomplished as follows: The regular wrapping of canvas and rubber which forms the inner covering $d$ is wound over a mandrel of the correct diameter and length. The armor being coated with rubber cement is then laid lengthwise on the mandrel over the first wrapping on the side which is intended for the tread, after which the outer covering $e$ is wound on over the armor in the usual manner. The ends are then brought together and vulcanized and the tire properly molded.

When it is known that the armor when finished is pressed to a thickness of less than one-sixteenth of an inch, it will be readily understood that the soft rubber on the inner and outer coverings $d$ and $e$ will stick together and form a union or connecting-point through each of the holes in the center of the armor. This is done to more firmly unite the inner and outer coverings and to equalize the stretch and contraction of the armor, which the following will explain:

Even though the greatest care may be taken it is quite impossible to shave the strips of rawhide so that the whole strip will be of uniform thickness and strength. Thus when the armor is finished one portion of the armor is likely to be weaker than another, and when the tire is inflated the armor would be apt to stretch most at the weak place, but when the inner and outer coverings $d$ and $e$ are united at regular intervals through the holes $s$ the stretch of the armor will be limited to the exact stretch of the coverings between the united points, and it is thus equalized throughout the circumference of the tire.

It will be particularly noticed that in making the hole $s$ a solid piece is cut from the center of the lower lap $n$, while only a semicircular piece is cut from each edge of the top lap $m$, as shown at $s'$, Figs. 1 and 2. This gives us the proper fastening of the covers and practically seals the bottom lap $n$ to the outer cover, but it leaves the top lap $m$ free between the secured points, so that the fastening in no way interferes with the universal stretch of the armor. In Figs. 2 and 7, $t$ represents the united portions of the inner and outer coverings $d$ and $e$.

When any substance sufficiently hard to resist a puncture is inserted as an armor, its tendency is to flatten out laterally when pressure is exerted against the tread portion. This is so because the air is compressed vertically and must expand laterally. Thus in all armored tires of this kind the edges of the armor extending along the sides of the tire will soon cut the outer covering. To guard against this, I concave the armor to a curvature which is greater in a transverse direction than the outer covering $e$ of the tire, so that the edges of the armor before the covers $d$ and $e$ are vulcanized together would stand inwardly and away from the sides of the tire, as shown at $c\ c$, Fig. 5. Thus when the coverings are properly vulcanized, as shown in Fig. 6, the whole of that portion of the tire covered by the armor has an equally-distributed vertical resistance against the pressure on the center of the tread, and the resiliency of the tire is in consequence considerably increased.

Another feature in the construction of my improved tire is to block the upper edges C, Fig. 7, with rubber or a suitable substance, as $g$, that will vulcanize with the inner and outer coverings $d$ and $e$ and act as a cushion for the edges of the armor to thrust against when the tire is for use on heavy vehicles.

Having thus described my invention, what I claim as new, and desire to secure by Letters Patent, is as follows:

1. An armor for pneumatic tires composed of a transversely-concave strip of rawhide or a similar substance having its concave surface longitudinally crimped so as to maintain the concavity of said strip, substantially as described.

2. An armor for pneumatic tires composed of a transversely-concave strip of rawhide or similar substance and consisting of a flattened helix forming laminated series of angular laps $m$ and $n$, the laps of one of said series being crimped to maintain the concavity in said strip, substantially as set forth.

3. An armor adapted to be inserted at the tread side of pneumatic tires composed of a strip of rawhide or similar substance consisting of a flattened helix forming laminated series of angular laps, the laps of one of said series being transversely crimped and the laps of the other of said series being transversely stretched when the strip is formed, so as to produce and maintain a transverse concavity in said strip, substantially as described.

4. A bicycle-tire composed of the inner and outer layers $a$ and $d$ and an intermediate non-puncturable strip arranged at the tread side of said tire and composed of rawhide, said strip consisting of a flattened helix comprising laminated series of laps $m$ and $n$, the inner and outer layers of said tire being integrally connected between the laps of one of said series and through each lap of the other of said series, substantially as described.

5. An armor for pneumatic tires composed of rawhide or a similar substance and adapted to be inserted at the tread side of the tire and consisting of a flattened helix, forming laminated series of laps and provided with perforations which extend through the strip where the interstices between adjoining laps of one of said series traverse the corresponding laps of the other of said series, said perforations being adapted to permit of integrally connecting the inner and outer coverings of the tire, substantially as described.

6. A pneumatic tire for bicycles consisting of an inner and an outer covering and an armor formed of a flexible strip composed of rawhide or a similar substance, said strip being arranged on the tread side of said tire and being provided with a series of longitudinally-arranged holes through which the inner and outer coverings of the tire are integrally united so as to limit and equalize the longitudinal stretch of the said armor to and with that of the coverings, substantially as described.

In testimony that I claim the foregoing improvement in armored pneumatic tires for bicycles, as above described, I have hereunto set my hand this 1st day of May, 1897.

ISAAC S. McGIEHAN.

Witnesses:
C. L. MALCOLM,
J. H. BELL.